United States Patent
Schaller (10) Patent No.: US 6,712,222 B2
(45) Date of Patent: Mar. 30, 2004

(54) INTEGRATED SCUM BAFFLE AND LAUNDER COVER FOR USE IN A CLARIFIER TANK

(76) Inventor: Earle Schaller, 108 B Palm Bay Dr., Palm Beach Gardens, FL (US) 33418

( * ) Notice: Subject to any disclaimer, the term of this patent is extended or adjusted under 35 U.S.C. 154(b) by 0 days.

(21) Appl. No.: 10/207,371

(22) Filed: Jul. 29, 2002

(65) Prior Publication Data

US 2004/0016696 A1 Jan. 29, 2004

(51) Int. Cl.[7] ............................................. B01D 21/24
(52) U.S. Cl. ...................... 210/540; 210/541; 210/528; 210/525
(58) Field of Search ................. 210/525, 528, 210/532.1, 538, 539, 540, 541, 542

(56) References Cited

U.S. PATENT DOCUMENTS

| | | | |
|---|---|---|---|
| 4,391,704 A | * 7/1983 | Anderson | 210/539 |
| 4,767,536 A | 8/1988 | Roley | 210/532 |
| 5,176,823 A | * 1/1993 | Roley | 210/539 |
| 5,252,205 A | * 10/1993 | Schaller | 210/540 |
| 5,597,483 A | * 1/1997 | Schaller | 210/528 |
| 5,670,045 A | 9/1997 | Schaller | 210/540 |
| 5,965,023 A | 10/1999 | Schaller | 210/540 |
| 6,216,881 B1 | * 4/2001 | Schaller | 210/540 |

* cited by examiner

Primary Examiner—Christopher Upton
(74) Attorney, Agent, or Firm—Sofer & Haroun, LLP (57) ABSTRACT

The present invention is directed to a water treatment tank apparatus. The apparatus is further comprised of a cover section having first and second ends, where the first end is secured to an outer tank wall and the second end positioned over the entire launder channel and radially inwards to a scum baffle and integrated mounting bracket, for preventing light from reaching interior surfaces. The cover is dimensioned to span the width of the launder channel, weir and spillway, and is comprised of a substantially opaque material, to inhibit algae growth.

A support flange is provided, coupled to the tank wall, for supporting the first end of the cover section. A bracket mount for attaching the scum baffle with integrated mounting bracket to the vertical peripheral wall is also provided where the scum baffle with integrated mounting bracket has a baffle portion and a mounting bracket portion such that the bracket mount extends away from the peripheral wall for a distance greater than the length of the mounting bracket portion of the scum baffle with integral mounting bracket.

14 Claims, 5 Drawing Sheets

FIG. 5

INTEGRATED SCUM BAFFLE AND LAUNDER COVER FOR USE IN A CLARIFIER TANK

FIELD OF THE INVENTION

The present invention is directed to a water treatment tank apparatus. More specifically, the present invention is directed to a launder channel cover apparatus for use in a water treatment tank.

BACKGROUND

The necessity for providing sewage treatment plants to clean and purify water discharged from homes and factories is well known. The function of a sewage treatment facility is to receive raw sewage (water containing waste material) as discharged from a city sewage system and clean it to ultimately produce purified water. This is accomplished through a series of biological and mechanical processes.

In a typical water treatment facility, the raw sewage is received from the sewage system and passed through a coarse screen to remove large pieces of matter. The sewage is next directed to one or more primary sedimentation tanks or clarifiers. The sewage remains in primary sedimentation for a period of time sufficient to allow the majority of the heavy matter to settle to the bottom of the tank forming sludge. This sludge is removed for "digestion" by microorganisms. The digested sludge is then dried and can be used as compost or fertilizer. The remaining liquid is treated in a second biological system to remove ammonia. The liquid from this treatment is then aerated and passed into final sedimentation water treatment tanks to remove any remaining solid material.

Water treatment tank configurations vary with each treatment facility application. This notwithstanding, most final sedimentation water treatment tanks are circular. This simplifies automatic skimming, churning and/or bottom scraping operations. More specifically, by eliminating inaccessible corners and providing uniform surfaces, a revolving scraper arm or skimmer blade can provide complete and efficient churning and prevent sludge buildup.

During operation of one type of water treatment tank, water containing sediment enters the center of the tank. In a continuous process, the lighter clean water is effectively decanted from the heavier sediment containing water. More particularly, the clean water is displaced from the tank by the constant flow of water containing sediment into the tank. The displaced clean water is forced to flow under a baffle plate for collecting floating scum and then over a weir, ultimately entering a clean water flow channel. The clean water flow channel directs the water to the next treatment stage where it is chlorinated and further made safe to be discharged into a river or stream.

Presently, algae growth in the trough or launder channel is a serious problem in clarifier tanks. Specifically, as algae builds up on the weirs of the clarifier tank, it can substantially interfere with the hydraulic flow therethrough. Algae typically adheres to the surfaces of the weir and the trough, where it becomes unsightly and odorous. When the launder is cleaned, however, the algae is often loosened and causes clogging of the downstream filters.

For many years, the removing of algae from the baffle, weir, spillway and clean water flow channel has been completed primarily by scrubbing the tank structure with brushes manipulated by hand. Because the final treatment tanks are quite large, this is a labor-intensive and tedious process, involving a large expenditure of man-hours. Additionally, the algae removing process must be done frequently, thereby further adding to the cost.

More recent proposals directed at the problem of algae growth have utilized covers, such as fiberglass covers, which inhibit light from entering the baffle, weir, spillway and clean water flow channel of a circular tank. However, even though those covers prevent light from entering these areas greatly reducing algae production, periodic inspection and cleaning is still necessary. Thus, there is a need to provide not only an inexpensive launder channel cover which not only blocks light from entering the baffle, weir, spillway and the clean water flow channel, but also allows easy access to all of these regions for inspection and cleaning.

However, even with these improvements, algae and other buildup can still accumulate on the weir, spillways and on other portions of the lauder channel. As such, a need arises not only to prevent ultra violet rays from reaching the weir and lauder channel, but also to allow easy access to the entire lauder channel and all of its component parts including the weir and spillway so as to allow for easy cleaning and maintenance.

SUMMARY OF THE INVENTION

The present invention is directed to a water treatment tank apparatus including an influent, at least one substantially vertical peripheral wall forming a launder channel having an upper and an interior surface, a substantially vertical weir connected to the vertical peripheral wall, the launder channel having a width. The apparatus is further comprised of a cover section having first and second ends, where the first end is secured to an outer tank wall and the second end positioned over the entire launder channel and radially inwards to a scum baffle and integrated mounting bracket, for preventing light from reaching interior surfaces.

At least one panel member is dimensioned to span the width of the launder channel including a weir and spillway of the channel, and is comprised of a substantially opaque material, whereby the growth of algae on fluid contacting surfaces of the launder channel, weir and spillway is inhibited.

A support flange is provided, coupled to the tank wall, for supporting the first end of the cover section. A bracket mount for attaching the scum baffle with integrated mounting bracket to the vertical peripheral wall is also provided where the scum baffle with integrated mounting bracket has a baffle portion and a mounting bracket portion such that the bracket mount extends away from the peripheral wall for a distance greater than the length of the mounting bracket portion of the scum baffle with integral mounting bracket.

A pivot means is coupled to the mounting bracket portion of the scum baffle with integral mounting bracket and to the cover section for pivoting the cover section away from the outer tank wall about a pivot axis between a first closed position and a second open position so as to allow complete access for cleaning and inspection of the weir, spillway and launder channel.

BRIEF DESCRIPTION OF THE FIGURES

In the drawings, wherein like reference numbers denote similar elements throughout the several views.

DETAILED DESCRIPTION OF THE PREFERRED EMBODIMENTS

Figure 1:
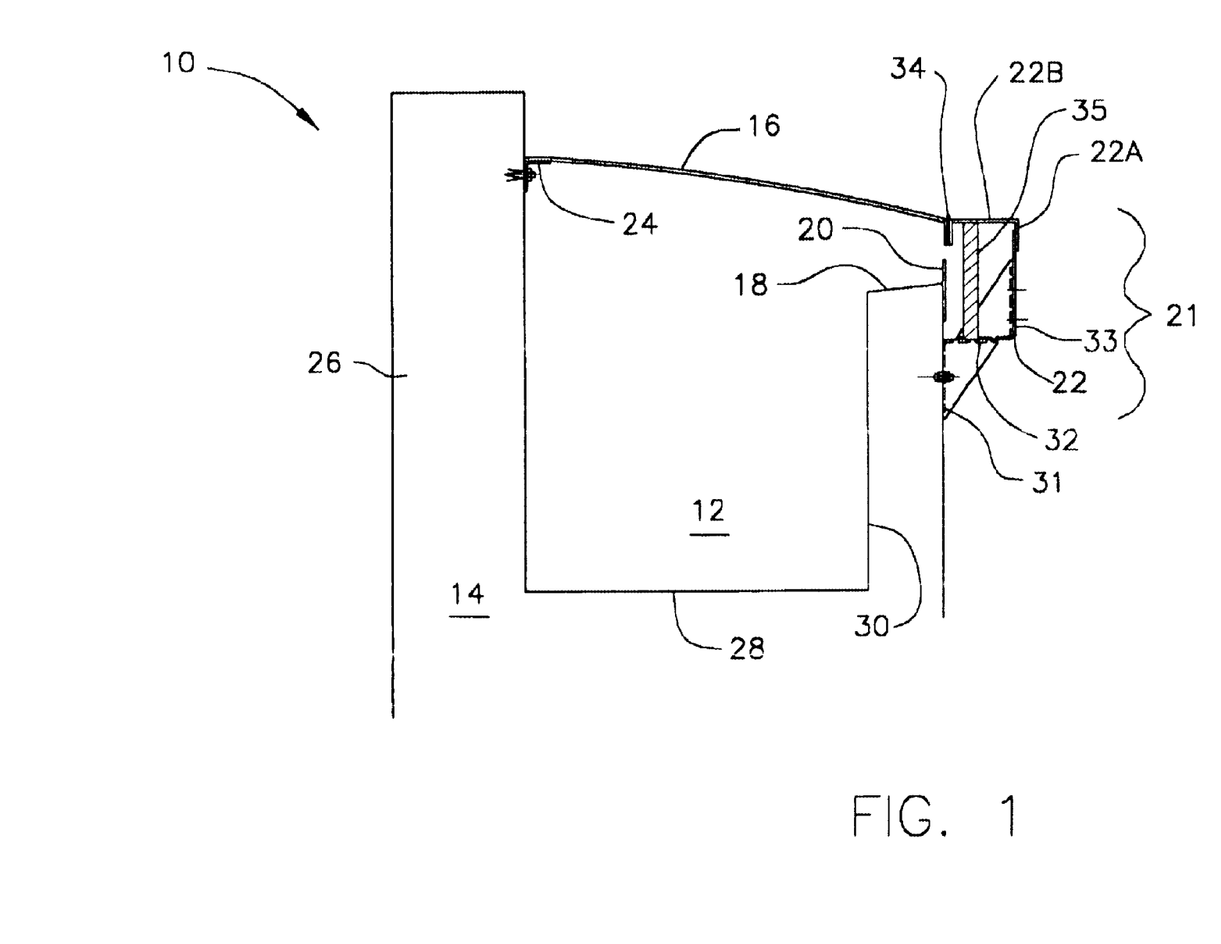
FIG. 1 illustrates a cross-section of a launder channel and a cover, in accordance with one embodiment of the present invention.

Reference is now made to FIG. 1 showing the cover system 10 of the present invention installed over the clean water flow or launder channel 12 of a final sedimentation water treatment tank 14. In the illustrative embodiment depicted in FIG. 1, system 10 is configured as a modular assembly of individual cover sections 16, only one of which panel members is shown. In accordance with the present invention, each cover section 16 is securable to tank 14 and, when installed in the position shown in FIG. 1, is dimensioned to completely cover the launder channel 12, a spillway 18, and a weir gate 20.

As discussed previously, a principal object of the present invention is to prevent the growth of algae on the interior surfaces of launder channel 12, weir 20 and spillway 18 while simultaneously providing easy access to channel 12, spillway 18 and weir 20 for periodic inspection and cleaning. To this end, each cover section 16 comprises an opaque material which reflects and/or absorbs substantially all light incident thereon. In this regard, it will be readily appreciated that a wide variety of rigid or flexible materials may be utilized for the construction of cover sections 16. Cover sections 16 may, for example, be formed from metal or alloys thereof, fiberglass, or from substantially opaque thermosetting or thermoplastic materials. It is also possible, of course, to make cover sections 14 opaque by applying a suitable coating, such as a light reflective or absorptive coating, to the exterior and/or interior surfaces thereof. In so doing, it is possible to utilize even transparent or translucent plastic materials to fabricate cover sections 16 of the present invention.

As illustrated in FIG. 1, it will be seen that the cover section 16 of cover system 10 may be dimensioned and contoured to achieve a contiguous relationship with the interior surface of clarifier tank 14 and with each other. Clarifier tank 14 has may have either a circular sidewall configuration or a straight linear configuration. Accordingly, in the circular sidewall configuration, each panel member 16 maintains an exterior edge surface having a radius of curvature corresponding to the radius of curvature of the tank.

In a currently preferred implementation, the individual covers 16 are fabricated from a molded reinforced fiberglass composite as a one piece, unitarily-integrated unit. Thus, each molded cover incorporates cover sections 16, and, if desired, a flange to facilitate securing of cover section 16 to the clarifier tank 14. Advantageously, this enables significant reductions in both manufacturing time and for installation as compared to other prior art arrangements and systems. Most preferably, the thickness of cover sections 16 is in the range of about 3/16 to 3/4 of an inch, a range that provides substantial structural strength and rigidity while remaining sufficiently light weight for unusual ease of installation. Each cover section 16 can also be provided with a network of cross braces or other strengthening members (not shown) to enhance the rigidity to each cover section 16 and provide a walkway surface capable of supporting one or more maintenance workers. Typically, such cross braces or other strengthening members can be fabricated out of a lightweight material such as balsa wood which can then be sandwiched between two or more layers of fiberglass. If desired, the tipper surface of each cover section 16 may be provided with a roughened, non-skid texture to prevent injury to such workers.

As will be readily appreciated by those skilled in the art, a variety of fastening devices and techniques may be used to secure panel members 16 in position over the launder channel 12. In the embodiment shown in FIG. 1, a cover mounting flange 24 is mounted on the interior, circumferential surface of clarifier tank 14. Several mounting flanges 24 may be secured directly to the peripheral wall of the clarifier tank using conventional mechanical fasteners at radially spaced intervals around the entire circumference of tank 14 so as to support cover sections 16. One example of a mounting flange 24 is an angled mounting flange with a vertical side secured to outer side wall 26 of tank 14 and a horizontal side for providing the support for cover section 16.

Cover mounting flange 24 in configured to releasably secure cover sections 16 to outer side wall 26 via removable quick release pins such that the upper portion of cover sections 16 may be disengaged from outer side wall 26 to allow cover sections 16 to be pivoted into the open position. It should be noted that is intended only as an example of one possible method for releasably securing cover sections 16 to tank 14. Any similar connection method of cover sections 16 to tank 14 which provide for releasably securing the cover sections 16 is within the contemplation of the present invention.

In one embodiment of the present invention, as illustrated in FIG. 1, launder channel 12 is formed in tank 14, by outer tank wall 26, which represents the outer perimeter of the clarifier tank, bottom channel wall 28 and inner channel wall 30. Inner channel wall 30 defines the height of channel 12 whereas bottom channel wall 28 defines the width of channel 12 extends away from outer clarifier tank wall 26.

It should be noted that outer tank wall 26, which forms the outer boundary of tank 14, bottom channel wall 28 and inner channel wall 30 are preferably formed of concrete or other such suitable material which can withstand the rigorous requirements of waste treatment tanks. However, this is in no way intended to limit the scope of the present invention. Other materials can be used to form the tank or the launder channel provided they are capable of withstanding the requirements for waste treatment tanks.

Inner channel wall 30 further maintains spillway 18 which guides the water from the central portion of clarifier tank 14 into launder channel 12. Along the circumference of outer channel wall 30, at the head of spillway 18, facing the inner portion of launder tank 14, weir 20 is disposed so as to screen the water as it spills over into channel 12. Weir 20 is used in addition to scum baffle 22 to help prevent solid waste that is floating in tank 14 from entering launder channel 12, assisting in the clarification process of the water.

In one embodiment of the present invention, as illustrated in FIG. 1, a scum baffle and integral attachment bracket 21 are mounted on inner channel wall 30 of launder channel 12. The integral attachment bracket is denoted as element 32 and as the scum baffle as element 22. Bracket 32 has a mounting surface 31 for mounting on inner channel wall 30 on the outside of launder channel 12 facing inwardly toward the center of launder tank 14 and a mounting surface 33 so that scum baffle 22 may be mounted thereon in any suitable manner ie. screws, bolts, revits. In another embodiment, bracket 32 and scum baffle 22 are integrally formed as a onepiece fiberglass unit. Scum baffle and integral cover bracket 21 extends upwardly in such a way so as to support cover 16. It should be noted that scum baffle with integral attachment bracket 21 may be formed of single continuous unit or it could consist of several pieces fastened together but installed as a single piece.

As illustrated in FIG. 1, scum baffle with integral attachment bracket 21 maintains two portions, a vertical baffle portion 22A, and a horizontal cover mount portion 22B. Baffle portion 22A, extends substantially parallel to weir 20 and inner channel wall 30 and provides an additional barrier for solid wastes from entering launder channel 12. Baffle portion 22A is supported on surface 31 of bracket 32, described above.

As illustrated in FIG. 1, integral cover mount portion 22B extends perpendicularly away from the top of baffle portion 22A in a direction towards launder channel 12. Integral cover portion 22B extends for a length such that it terminates at a distal end prior to the beginning of inner channel wall 30 and weir 20. Scum baffle with integral attachment bracket 21 extends away from inner channel wall 30; baffle portion 22A, attached to bracket 32 extends upwardly out of the water line and integral cover portion 22B extends perpendicularly back towards channel 12 for a lesser distance than bracket 32 extends away from channel 12. Thus, integral cover portion 22B terminates prior to reaching inner channel wall 30 and weir 20.

In one embodiment of the present invention, as illustrated in FIG. 1, integral mount potion 22B maintains a hinge clement 34 disposed at the end distal to baffle portion 22A.

Specifically, the hinge 34, which is preferably fabricated out of stainless steel, allows cover sections 16 disposed peripherally about tank 14 to pivot away from launder channel 12 about a pivot axis between a first closed position and a second open position so as to allow access for cleaning and maintenance of launder channel 12, weir 20 and spillway 18.

The pivot axis is located at a point away from the weir, so that the cover section 16 is longer, ie. extends over the weir 20 and launder channel 12. In the closed position, as illustrated in FIG. 1, cover sections 16 extends from cover mounting flange 24 on outer tank wall 26 of tank 14, across the top of launder channel 12 to hinge 34 where it is removable attached to integral cover portion 22B of scum baffle with integral attachment bracket 21. In this configuration, cover sections 16 are supported on the first side of launder channel 12 by cover mounting flange 24 and supported on the second side of launder channel 12 by inner channel wall 30 by the attachment bracket 32 which is mounted to inner wall channel 30. This allows cover sections 16 to protect and extend over both the areas of launder channel 12 and weir 20, as well as spillway 18 which are all susceptible to algae growth. In a preferred embodiment, vertical support 35, which is mounted to bracket 32 at one end and to cover portion 223 at the other end, is utilized in order to provide increase rigidity of the scum baffle/bracket (element 21) configuration. Vertical support 35 may be positioned proximate hinge 34 so as to allow the opening and closing of cover 16.

However, as discussed above, even though cover section 16 protects weir 20 and spillway 18 from light, after time, these areas still can become blocked or clogged with either minimal algae growth or with solid waste from the water in the tank which is not blocked by scum baffle 22. In order to clean this area it becomes necessary to easily open cover sections 16 so as to clean these areas to allow proper water flow into launder channel 12.

Figure 2:
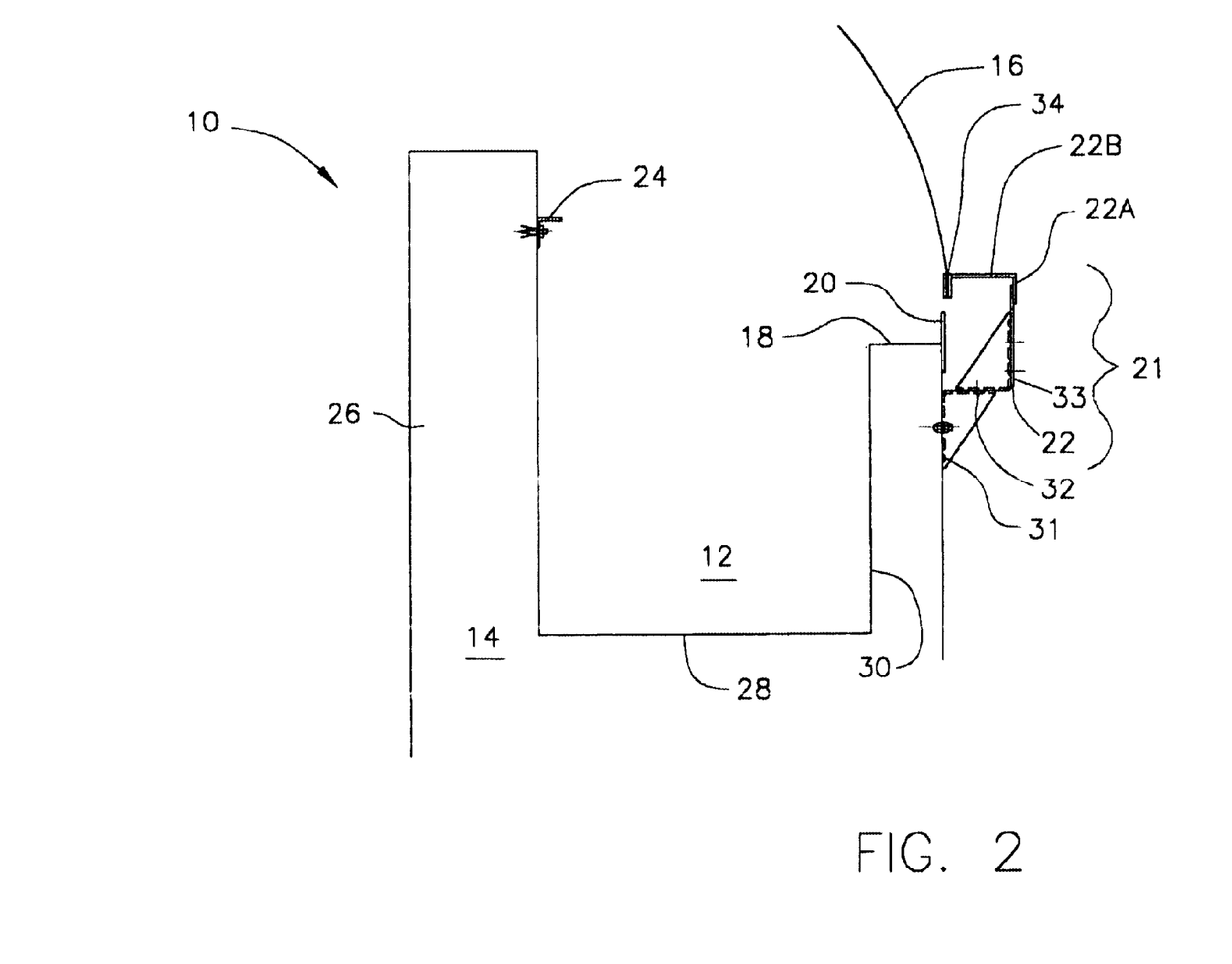
FIG. 2 illustrates a cross-section of the launder channel and a cover from FIG. 1 in an open position, in accordance with one embodiment of the present invention.

In one embodiment of the present invention, as illustrated in FIG. 2, cover section 16, can be opened for access to clean weir 20 and spillway 18. To open cover section 16, the first end of cover section 16, supported by outer tank wall 26 via cover mounting flange 24, is lifted from flange 24 and pivoted about hinge element 34 located between cover section 16 and integral cover portion 22B of scum baffle and integral mounting bracket 21. Thus, when open, cover section 16 is positioned substantially vertical from hinge 34, thus exposing launder channel 12.

In this configuration, cover section 16 is lifted away from launder channel 12 exposing the entire launder channel 12, weir 20 and spillway 18 for cleaning. Because of the length of baffle and cover mounting bracket attachment 32, and scum baffle and integral mounting bracket 22, hinge 34 is located in such a position that upon opening, all of the functional areas of channel 12 can be accessed and cleaned by opening cover section 16 in a single motion, eliminates the need for time consuming removal of other cover sections for cleaning different areas of launder channel 12.

Figure 3:
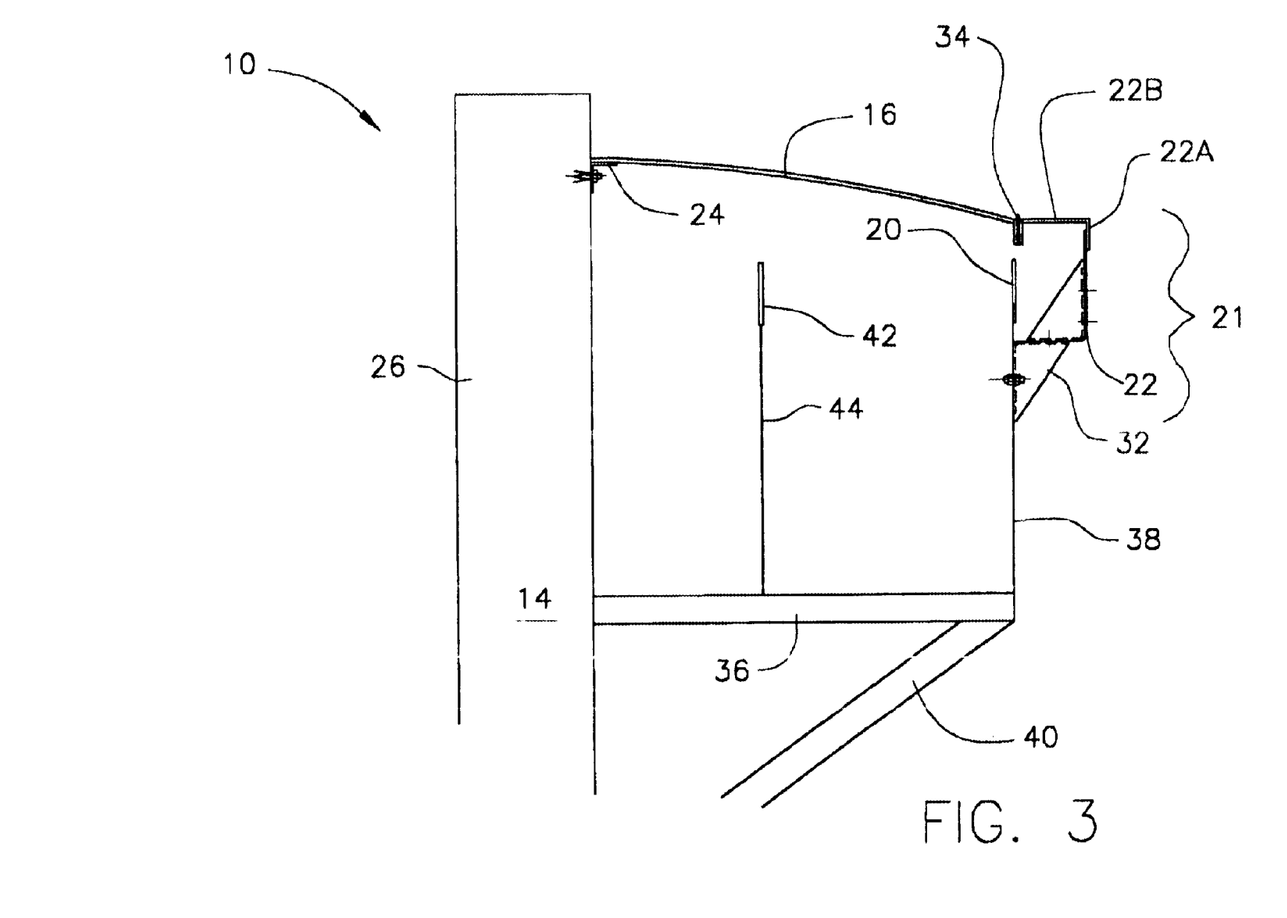
FIG. 3 illustrates a cross-section of a launder channel and a cover in accordance with one embodiment of the present invention.

In another embodiment of the present invention, as illustrated in FIG. 3, launder channel 12 of tank 14 is constructed of material different than that of concrete outer tank wall 26, such as stainless steel. In this embodiment, launder channel 12 is formed by bottom channel panel 36 and inner channel panel 38. A channel support bracket 40 is disposed on the under side of bottom channel element 36 and inner channel panel 38 and extends to outer tank wall 26 so as to support channel 12.

Inner channel panel 38 further maintains weir 20 to regulate the water level needed in tank 14 for the water to spill over into channel 12. Weir 20 is used to in addition to scum baffle 22 to help prevent solid waste that is floating in tank 14 from entering launder channel 12, thus assisting in the clarification process of the water.

In one embodiment of the present invention, as illustrated in FIG. 3 a secondary weir 42 is disposed within channel 12, mounted on secondary weir mount 44 so as further subdivide launder channel 12 into first and second sub-channels 12A and 12B. This configuration provides further barriers to prevent solid waste from entering launder channel 12. As illustrated after the water passes under baffle 22 and over weir 20, the water spills into sub-channel 12A. After sub-channel 12A is filled to a particular level, the water again spills over secondary weir 42 in sub-channel 12B adding an additional solid waste filtering process.

Figure 4:
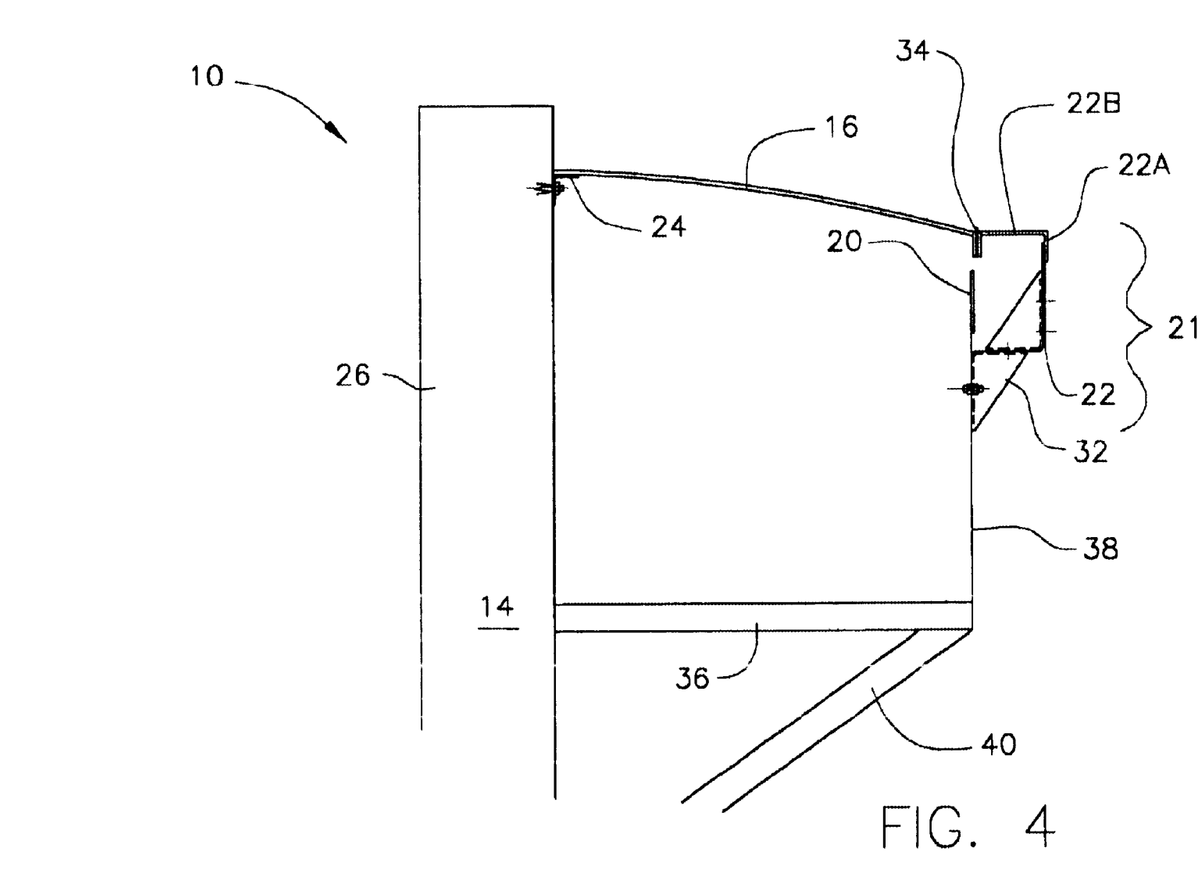
FIG. 4 illustrates a cross-section of a launder channel and a cover in accordance with another embodiment of the present invention.

It should be noted that in this embodiment which utilizes bottom channel panel 36 and inner channel panel 38, that the inclusion of a secondary weir is intended only as one example of possible additional filtering step. However, this is in no way intended to limit the scope of the present invention. For example, several additional weirs can be added so long as they fit within launder channel 12. Alternatively, no secondary weirs need be added, as illustrated in FIG. 4. However, for the purpose of illustration, the example of launder channel 12 formed by bottom channel panel 36 and inner channel panel 38 illustrated in FIG. 3, a single secondary weir 42 will be used to illustrate the embodiment of the launder channel 12 of tank 14.

In one embodiment of the present invention, as illustrated in FIG. 3, a scum baffle and integral cover mount attachment bracket 32 is mounted on inner channel panel 38 of launder channel 12. Bracket 32 is mounted on inner channel panel 38 on the outside of launder channel 12 facing inwardly toward the center of launder tank 14. Scum baffle and integral cover mount attachment bracket 32 extends upwardly in such a way so as to support scum baffle with integral mount 22.

As illustrated in FIG. 3, scum baffle with integral cover mount 21 maintains two portions, a baffle portion 22A, and an integral cover mount 22B. Baffle portion 22A, extends parallel to weir 20 and inner channel panel 38 and provides an additional barrier for solid wastes from entering launder channel 12. Baffle portion 22A is supported via baffle and integral cover mount attachment bracket 21, described above, which extends from inner channel panel 38. In this configuration channel 12 supports baffle portion 22A of scum baffle with integral mount 22.

As illustrated in FIG. 3, integral cover portion 22B of baffle with integral mount 22 extends perpendicularly away from the top of baffle portion 22A in a direction towards launder channel 12. Integral cover portion 22B extends for a length such that it terminates at a distal end prior to the beginning of inner channel panel 38 and weir 20. Baffle and integral cover mount attachment bracket 32 extends away from inner channel wall 30; baffle portion 22A, attached to bracket 32 extends upwardly out of the water line and integral cover portion 22B extends perpendicularly back towards channel 12 for a lesser distance than bracket 32 extends away from channel 12. Thus, integral cover portion 22B terminates prior to reaching inner channel panel 38 and weir 20.

In one embodiment of the present invention, as illustrated in FIG. 3, integral mount portion 22B maintains a hinge element 34 disposed at the end distal to baffle portion 22A. Specifically, the hinge 34, which is preferably fabricated out of stainless steel, allows cover sections 16 disposed circumferentially about tank 14 to pivot away from launder channel 12 about a pivot axis between a first closed position and a second open position so as to allow access for cleaning and maintenance of launder channel 12, weir 20 and spillway 18.

In the closed position, as illustrated in FIG. 3, cover sections 16 extends from cover mounting flange 24 on outer tank wall 26 of tank 14, across the top of launder channel 12 to hinge 34 where it is removably attached to integral cover portion 22B of scum baffle integral mounting bracket 22. In this configuration, cover sections 26 are supported on the first side of launder channel 12 by cover mounting flange 24 and supported on the second side of launder channel 12 by inner channel wall 30 via baffle cover bracket attachment 32 and scum baffle and integral mounting bracket 22. This allows cover sections 16 to protect the areas of launder channel 12, particularly weir 20, secondary weir 42 and spillway 18 which are susceptible to algae growth.

However, as discussed above, even though cover section 16 protects weir 20, secondary weir 42 and spillway 18 from light, after time these areas still can become blocked or clogged with either minimal algae growth or with solid waste from the water in the tank which is not blocked by baffle portion 22A of scum baffle and integral mounting bracket 21. In order to clean this area it becomes necessary to easily remove cover sections 16 so as to clean these areas to allow proper water flow into launder channel 12.

Figure 5:
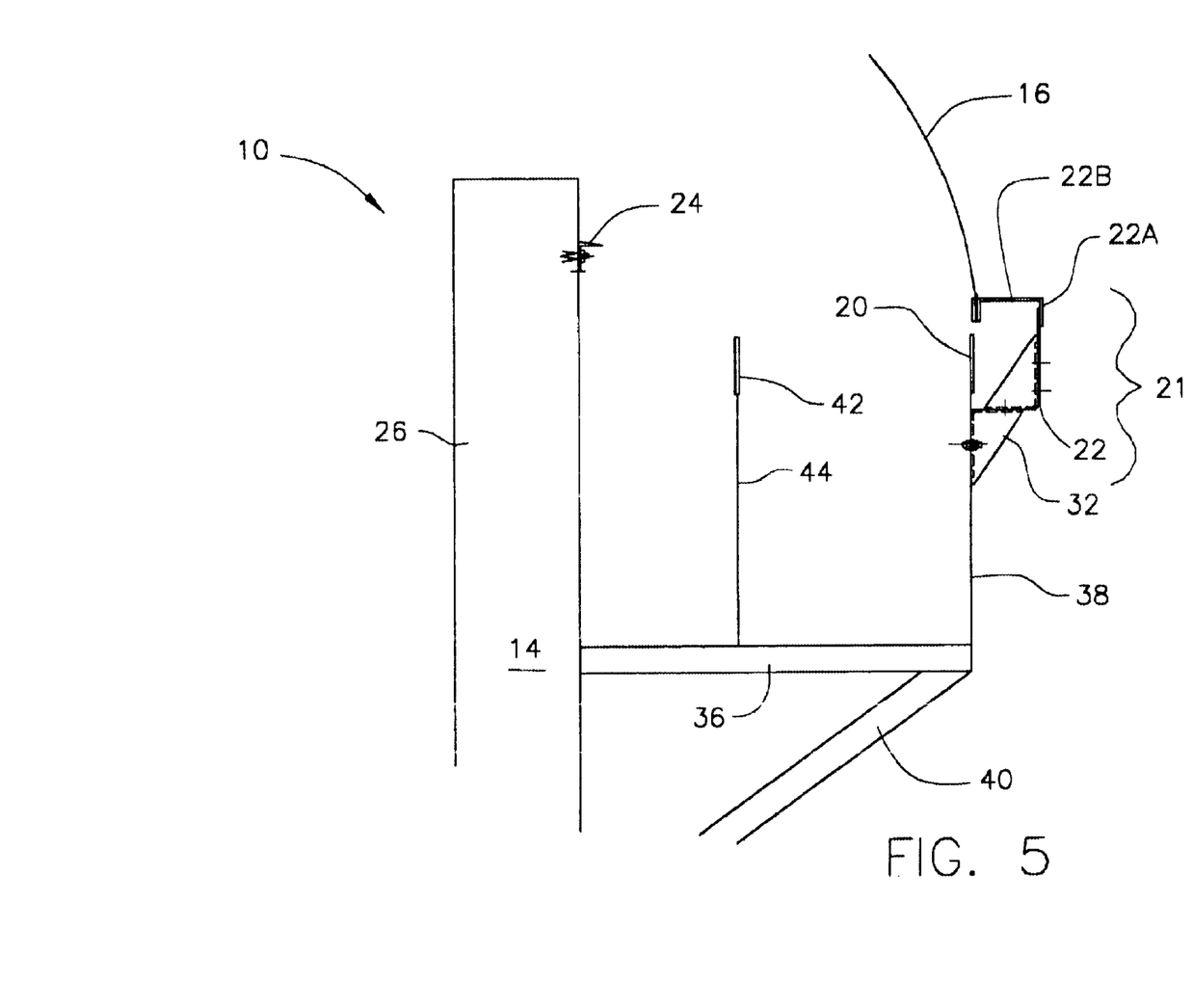
FIG. 5 illustrates a cross-section of the launder channel and a cover from FIG. 3 in an open position, in accordance with one embodiment of the present invention.

In one embodiment of the present invention, as illustrated in FIG. 5, cover section 16, can be opened for access to clean weir 20, secondary weir 42 and spillway 18. To open cover section 16, the first end of cover section 16, supported by outer tank wall 26 via cover mounting flange 24, is lifted from flange 24 and pivoted about continuous hinge element 34 located between cover section 16 and integral cover portion 22B of scum baffle and integral mounting bracket 21. Thus, when open, cover section 16 is positioned substantially vertical from continuous hinge 34, thus exposing launder channel 12.

In this configuration, cover section 16 is lifted away from launder channel 12 exposing the entire launder channel 12, weir 20, secondary weir 42 and spillway 18 for cleaning. Because of the length of baffle and cover mounting bracket attachment 32, and scum baffle and integral mounting bracket 21, hinge 34 is located in such a position that upon opening, all of the functional areas of channel 12 can be accessed and cleaned by opening cover section 16 in a single motion, eliminating the need for time consuming removal of other cover sections for cleaning different areas of launder channel 12.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A water treatment tank apparatus including an influent, at least one substantially vertical peripheral wall forming a launder channel having an upper and an interior surface, a substantially vertical weir connected to said vertical peripheral wall, said launder channel having a width, said water treatment tank apparatus comprising:

a cover section, said cover section having first and second ends, said first end being secured to an outer tank wall and said second end positioned over the entire launder channel and inwards to a scum baffle and integrated mounting bracket, for preventing light from reaching interior surfaces thereof, said at least one panel member being dimensioned to span the width of said launder channel including a weir and spillway of said channel, and being comprised of a substantially opaque material, whereby the growth of algae on fluid contacting surfaces of the launder channel, weir and spillway is inhibited;

a support flange coupled to said tank wall for supporting said first end of said cover section;

a bracket mount for attaching said scum baffle with integrated mounting bracket to said vertical peripheral wall, said scum baffle with integrated mounting bracket having a baffle portion, a cover portion and a mounting bracket portion wherein said mounting bracket portion extends away from said peripheral wall for a distance greater than the length of said cover portion of said scum baffle with integral mounting bracket; and a pivot means coupled to said cover portion of said scum baffle with integral mounting bracket and to said cover section for pivoting said cover section away from said outer tank wall about a pivot axis between a first closed position and a second open position so as to allow complete access for cleaning and inspection of said weir, spillway and launder channel.

2. The apparatus of claim 1, wherein said cover section is dimensioned to span the width of said launder channel and to cover said vertical weir.

3. The apparatus of claim 1, wherein each of said cover sections defines a first lateral surface, a second lateral surface, an interior edge surface and an exterior edge surface.

4. The apparatus of claim 3, wherein the tank is substantially circular and the exterior edge surface of each of said cover sections defines a radius of curvature corresponding to that of the outer wall of the tank for contiguous engagement therewith.

5. The apparatus of claim 1, wherein said scum baffle has inside and outside surfaces, and wherein said second end of said cover section is positioned between said vertical weir and said scum baffle.

6. The apparatus of claim 1, wherein said pivot means further comprises a continuous hinge.

7. The apparatus of claim 1, wherein said support flange comprises an angled mounting flange, said angled mounting flange having a substantially vertical side secured to said peripheral wall of said tank and a substantially horizontal side for providing support for the upper portion of said cover section.

8. The apparatus of claim 1, wherein said support flange further comprises means for releasably securing said first end of said cover section to said tank.

9. The apparatus of claim 8, wherein said means for releasably securing said first end to said tank comprises removable quick release pins so that the upper portion of said cover section may be disengaged from said tank wall to allow said cover section to pivot about said pivot means so as to provide access to said launder channel.

10. The apparatus of claim 1, wherein said cover section is fabricated from a molded reinforced fiberglass composite as a one-piece, unitarily integrated unit.

11. The apparatus of claim 1, wherein said scum baffle with integral mounting bracket are fabricated from a molded reinforced fiberglass composite as a one-piece, unitarily integrated unit.

12. A water treatment tank apparatus including an influent, at least one substantially vertical peripheral wall forming a launder channel having an upper and an interior surface, a substantially vertical weir connected to said vertical peripheral wall, said launder channel having a width, said water treatment tank apparatus comprising:

a second weir, mounted on a second weir support disposed substantially in the middle of said launder channel, said second weir and said second weir support subdividing said lauder in channel into first and second sub-channels;

a cover section, said cover section having first and second ends, said first end being secured to an outer tank wall and said second end positioned over the entire launder channel including both sub-channels and inwards to a scum baffle and integrated mounting bracket, for preventing light from reaching interior surfaces thereof, said at least one panel member being dimensioned to span the width of said launder channel including a weir and spillway of said channel, and being comprised of a substantially opaque material, whereby the growth of algae on fluid contacting surfaces of the launder channel, weir, second weir and spillway is inhibited;

a support flange coupled to said tank wall for supporting said first end of said cover section;

a bracket mount for attaching said scum baffle with integrated mounting bracket to said vertical peripheral wall, said scum baffle with integrated mounting bracket having a baffle portion, a cover portion and a mounting bracket portion wherein said mounting bracket portion extends away from said peripheral wall for a distance greater than the length of said cover portion of said scum baffle with integral mounting bracket; and a pivot means coupled to said cover portion of said scum baffle with integral mounting bracket and to said cover section for pivoting said cover section away from said outer tank wall about a pivot axis between a first closed position and a second open position so as to allow complete access for cleaning and inspection of said weir second weir, spillway and launder channel.

13. The apparatus of claim 12, wherein said cover section is fabricated from a molded reinforced fiberglass composite as a one-piece, unitarily integrated unit.

14. The apparatus of claim 12, further comprising fastening means for releasably disengaging said cover section from said support flange such that said panel member is permitted to pivot about said pivot axis so as to provide ease of access to said launder channel.

* * * * *